May 25, 1954     R. C. RUSSELL     2,679,239
MECHANICAL ADJUSTING MECHANISM
Filed March 25, 1952     2 Sheets-Sheet 1
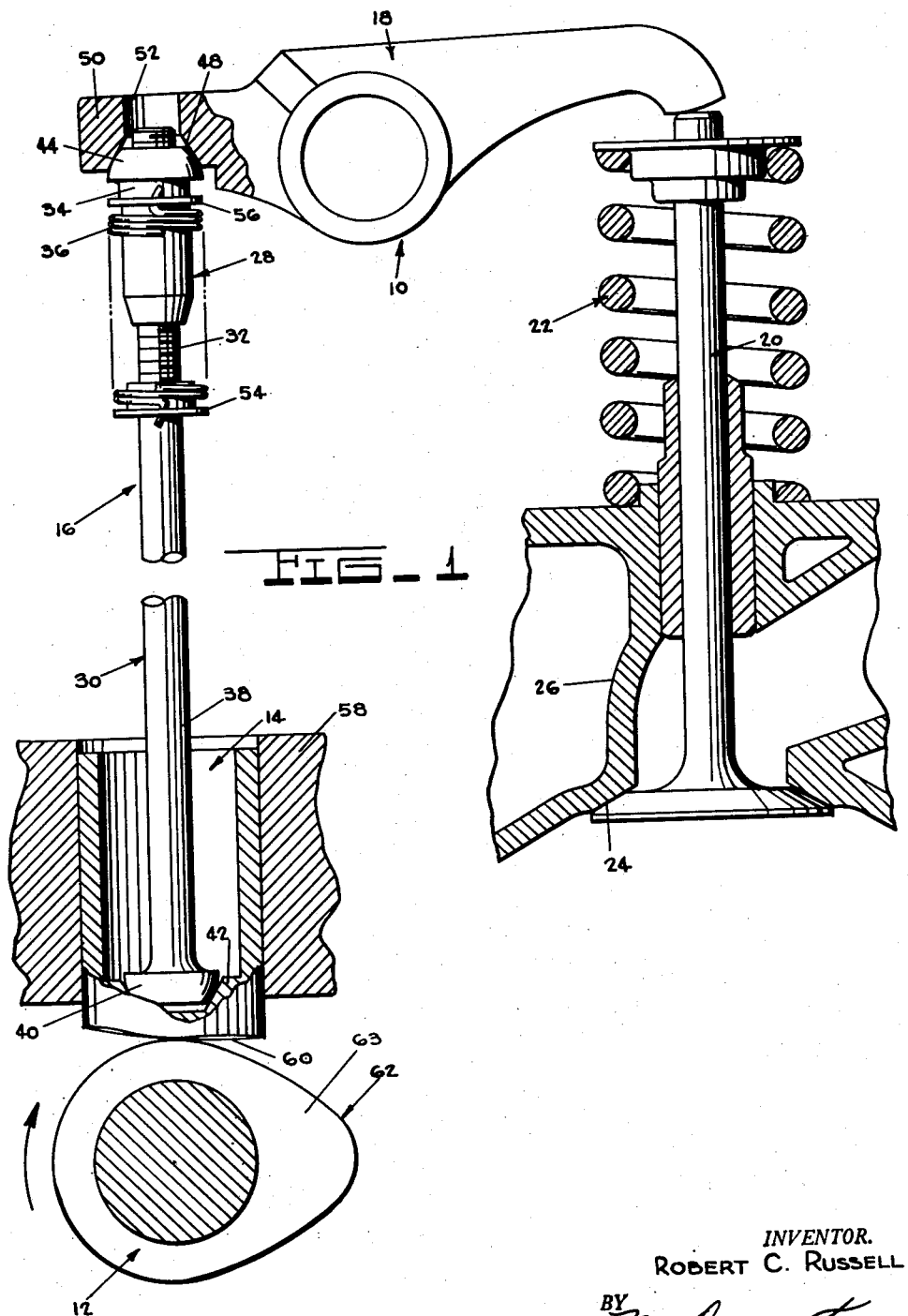
FIG_1
INVENTOR.
ROBERT C. RUSSELL
BY
ATTORNEYS May 25, 1954  R. C. RUSSELL  2,679,239
MECHANICAL ADJUSTING MECHANISM
Filed March 25, 1952  2 Sheets-Sheet 2
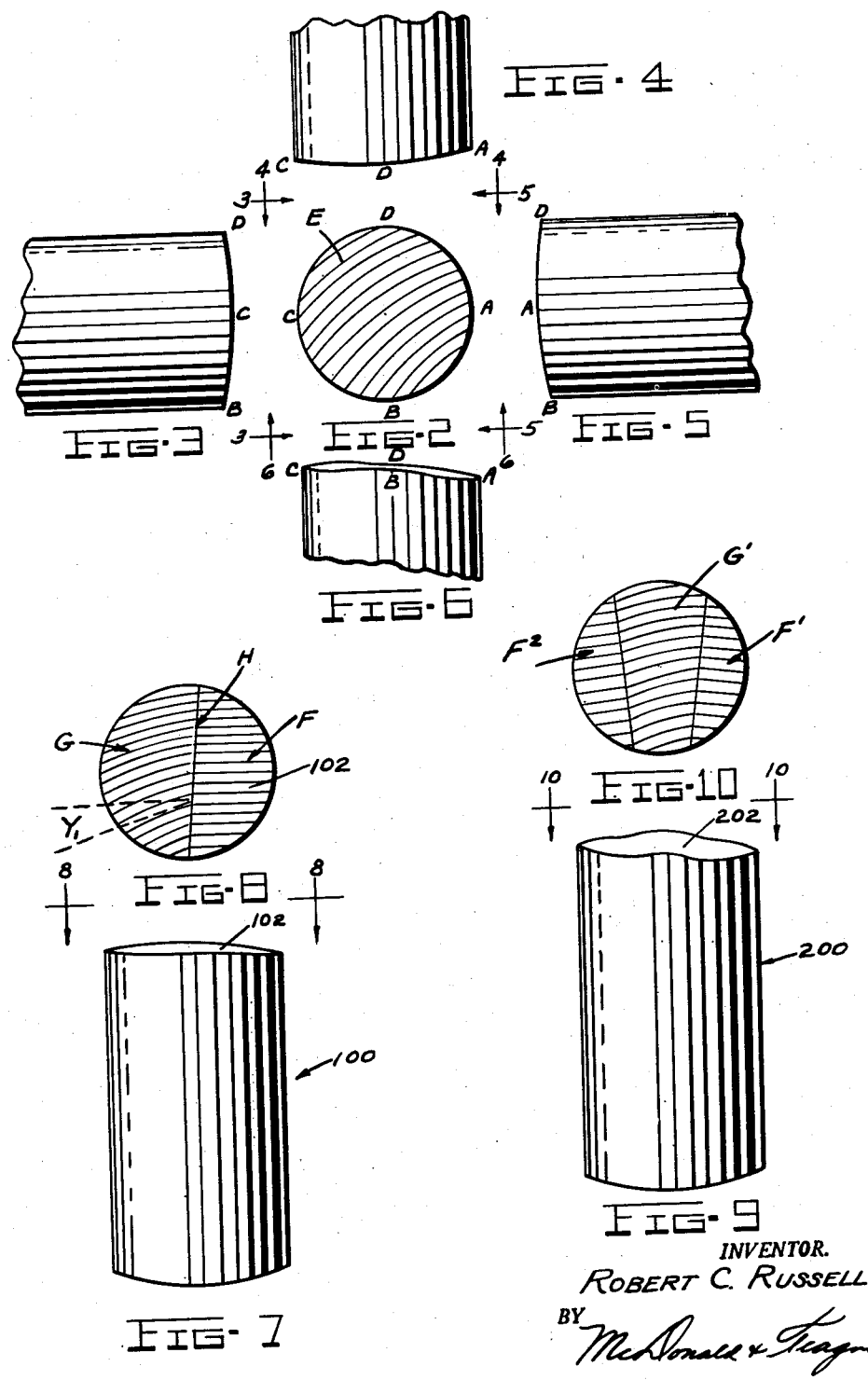
INVENTOR.
ROBERT C. RUSSELL
BY
ATTORNEYS Patented May 25, 1954

2,679,239

UNITED STATES PATENT OFFICE 2,679,239

MECHANICAL ADJUSTING MECHANISM

Robert C. Russell, Euclid, Ohio, assignor to Eaton Manufacturing Company, Cleveland, Ohio, a corporation of Ohio Application March 25, 1952, Serial No. 278,339

18 Claims. (Cl. 123—90)

1

This invention relates to valve operating mechanism for internal combustion engines and more particularly to mechanical means for automatically compensating for variations in the length of the operating components of said mechanism.

Broadly the invention comprehends the provision of a mechanical, length self-adjusting mechanism in the form of a torsion spring loaded screw and nut assembly incorporated in the component members of a valve operating mechanism and wherein through a prescribed turning of one member thereof a shortening or elongating compensation for the valve operating mechanism is attained. As a means of ensuring the turning of one member of the screw and nut assembly during the course of a valve operating cycle the tappet of the valve operating mechanism has its cam contacting surface so structurally formed whereby during the course of its being engaged by a rotating cam of the valve operating mechanism a varying degree of turning is imparted to the tappet which turning is directly imparted to one member of the screw and nut assembly for the necessary automatic adjustment thereof.

Among the several objects of the invention are the provision of a mechanical, length self-adjusting valve operating mechanism for internal combustion engines, that:

1. Is simple and economical of construction;
2. Ensures an automatic shortening or elongation adjustment of the valve operating mechanism to compensate for expansion, contraction, wear and etc.;
3. Provides for distribution of wear upon the cam contacting face of a tappet member of the valve operating mechanism;
4. Provides for substantially continuous full line contact between the engaging surfaces of the tappet and cam of the valve operating mechanism;
5. Includes a torsion spring loaded nut and screw member assembly effective through the rotative movement of one of the members relative to the other member to vary the length of the assembly and consequently the length of the valve operating mechanism;
6. Includes a cam or more specifically helical surface on the cam contacting face of the tappet engageable by an engine cam of conventional design whereby upon the imposing of a predetermined load therebetween a rotation of the tappet is achieved, which rotation is in turn imparted to one member of the nut and screw assembly for the adjustment thereof; and
7. Includes a tappet of the valve operating

2 mechanism having a cam or more specifically helical surface on at least a portion of its cam contacting face.

Other objects and advantages of the invention will appear from the following description taken in connection with the drawings forming a part of the specification; and in which:

Fig. 1 is a partly elevational partly cross-sectional view of a valve operating mechanism incorporating automatic length compensation means therein;

Fig. 2 is an end elevation view of the tappet of Fig. 1 looking in the direction of the cam contacting surface thereof;

Fig. 3 is a fragmentary view of the tappet of Figs. 1 and 2 taken substantially along lines 3—3 of Fig. 2;

Fig. 4 is a fragmentary view of the tappet of Figs. 1 and 2 taken substantially along lines 4—4 of Fig. 2;

Fig. 5 is a fragmentary view taken substantially along lines 5—5 of Fig. 2;

Fig. 6 is a fragmentary view taken substantially along lines 6—6 of Fig. 2;

Fig. 7 is a perspective side elevation view of a modified form of tappet from that shown by Figs. 1 through 6;

Fig. 8 is a view taken substantially along lines 8—8 of Fig. 7;

Fig. 9 is a perspective side elevation view of another modified form of tappet; and Fig. 10 is a view taken substantially along lines 10—10 of Fig. 9.

Similar reference characters indicate corresponding parts throughout the several views of the drawings.

This valve operating mechanism incorporating automatic length compensating means therein was devised primarily for the purpose of providing mechanism of simple and economical construction which is effective in operation and affords long service-free life.

The compensation means of the mechanism includes basically a torsion spring loaded screw and nut member assembly operation upon relative rotation therebetween to vary the length of the assembly.

As a means for providing for rotation of one of the members of the assembly the tappet of the valve operating mechanism is provided with a cam or more specifically helical or partly helical cam contacting surface engageable by the peripheral surface of a conventional engine cam. As such full line contact between the engaging surfaces of the tappet and cam are ensured and under load imposed between the tappet and cam, the helical surface of the tappet in contact with the cam provides for an oscillating motion of the tappet as the cam is rotated in engagement therewith. The tappet can be caused to be turned as desired depending on the location of the helical surface on the cam contacting face, that is the tappet can be turned during either an opening and/or closing cycle of the valve to be operated. Since the tappet and cam are under load during the opening and closing cycle of the valve, solely a shortening of the length compensating means occurs, at this time, and it is not until the cam is on its base circle portion of rotation that the length compensating means is restored to length either in retaining the shortening introduced or by taking up for the lift loss introduced in the length shortening operation.

Referring to the drawings for more specific details of the invention 10 represents generally a valve operating mechanism for an internal combustion engine comprising as component members thereof a cam 12 of conventional type, a tappet 14, a pushrod assembly 16, a rocker arm 18 and a valve 20.

As will be noted in viewing Fig. 1, the valve operating mechanism is shown virtually at rest wherein the cam upon clockwise movement thereof has just moved to its base circle portion and the valve has been actuated by valve spring 22 to closed position on its seat 24 in engine block 26.

An automatic length compensating device 28 for the valve operating mechanism is incorporated in pushrod assembly 16, the purpose and operation of which will hereinafter be stated.

The pushrod assembly includes a preferably slender screw element 30 having a screw threaded portion 32 at one end thereof, a nut element 34 threadingly engageable upon the screw threaded portion of element 30 and a torsion spring 36 interconnected between the nut and screw elements normally biasing them apart from one another.

The screw element 30 includes in addition to the screw threaded portion, an opposite axially extended portion 38 terminating at its extremity 40, opposite axially disposed from the threaded portion, in a portion of a sphere. The spherical end of the screw element is received in annular line bearing relation in a conical shaped socket 42 formed internally of tappet 14.

The nut element 34 in being threaded upon the screw element is normally positioned within the axial confines of the screw element such that a part of said threaded portion of the screw element protrudes axially outwardly beyond the outer end 44 of the nut element.

A spherical surface is provided upon outer end 44 of the nut adapted to have annular line bearing engagement with a conical shaped socket 48 formed as part of one arm 50 of rocker arm 18. With the threaded portion of screw element 30 extending axially beyond the nut element 34 and with the spherical end 44 of the nut element in bearing relation in socket 48 of the rocker arm, the threaded portion is received in an aperture 52 in the rocker arm concentric with the socket.

The torsion spring 36 is arranged in telescoping relation to the nut and screw elements under load with its opposite extremities secured respectively upon a collar 54 of the screw element and a collar 56 of the nut element tending to bias the screw and nut elements apart from one another. The pre-load of the spring is to be of an amount sufficient to permit of elongation of the pushrod to the extent of adjustment permitted.

The screw and nut elements are threaded left-handed for the purpose of explanation and preferably are to be of as low an angle as possible, such for example as $\frac{3}{8}$—20 threads.

Tappet 14 is supported for reciprocation in a tappet guide 58 and as such is free to rotate therein without interference.

A banked cam, compound curvatures, progressively different rate of contour or more specifically helical surface 60 is provided on one end of the tappet oppositely disposed from socket 42 thereof adapted for engagement with a surface 62 of cam 12. By making surface 60 of tappet 14 helical in form the ramp 63 portion of surface 62 of cam 12 is so engageable with the cam surface 60 as to provide for an oscillating movement of the tappet when a predetermined load is imposed upon the tappet and cam. Because of the helical surface of the tappet, the surface of the cam assumes a substantially full line contact therewith for all relative positions between the engaging surfaces of the cam and tappet, whereby as the cam is rotated a simulated relative threading or turning action occurs between the cam and tappet and since the peripheral surface of the cam follows a fixed path parallel to the axis of the cam, the tappet is made to turn relative thereto across the full helical surface on the tappet.

The pitch of the helical surface of the tappet is purposely made small, although the drawing for the purpose of illustration shows this in exaggerated size, since the turning of the tappet in a counter-clockwise direction is directly transmitted to the screw element 30 whereby through the left-hand thread engagement between the screw and nut elements a shortening of the assembly 16 will occur. In this way the lift loss introduced into the valve operating mechanism will be of an amount sufficient to compensate for length adjustment requirements thereof but not sufficient to appreciably effect the valve operation.

Figs. 3 through 6 show in exaggerated size, the elevational curvature of the cam engaging surface of the tappet taken at four 90° apart locations of the tappet. Fig. 6 taken substantially along lines 6—6 of Fig. 2 emphasizes the comparative heights of the four quadrant points A, B, C and D located at the outer periphery of the cam engaging surface 60, wherein for example starting with point A as the point of minimum height of the tappet, point B is .005″ higher than A, point C is .010″ higher and point D is .008″ higher. The lines E marked across the surface 60 of the tappet as noted in Fig. 2 are curved and as such are intended to represent a continuous curvature of surface 60 with the lines all emanating from a common centerpoint representing the axis for the helical surface 60 of the tappet sweeping, in viewing Fig. 6, in an upward helical form from right to left.

Fig. 1 is illustrative of the use of a cam or helical surfaced tappet in cooperative engagement with a conventional type internal combustion engine cam wherein, because of the left-hand relation of the threads of assembly 16, the curvature of the surface 60, the ramp 63 on the cam, and the rotation of the cam lockwise, a shortening of the assembly 16 is effected upon turning of the tappet counter-clockwise. Likewise, it is readily conceivable that with righthand threads on the assembly and with the cam rotating counter-clockwise or with the helical surface reversed, left-hand threads and the cam rotating counter-clockwise or with the helical surface reversed, righthand threads and the cam rotating clockwise, a like shortening of the assembly, as desired, is possible.

In a normal operation of this valve operating mechanism of Fig. 1 assuming that as shown the component valve 20, rocker arm 18, pushrod assembly 16, tappet 14 and the cam 12 are in zero clearance engagement with one another and with no other load than that of torque spring 36, a rotation of the cam in a clockwise direction from the position shown will immediately bring the ramp 63 into engagement with the tappet surface 60. With the ramp engaging the tappet surface tending to lift the tappet and other components of the valve operating mechanism associated therewith, the load of spring 22 by way of the valve, rocker arm, pushrod and tappet will be imposed on the tappet and cam engaging surfaces, such that with substantially line contacting relation between said surfaces a further rotation of the cam in the course of its rotation throughout a valve lifting and closing cycle will cause a screwing or threading relation between the helical surface of the tappet and the engaging surface of the cam. The screwing relation between the tappet and cam results from the line or zone of contact between the tappet and cam engaging surfaces moving up and down the ramp 63 and back and forth across the tappet surface, that is from approximately a center portion of the tappet out to its peripheral edge and back again to center, with the lifting portion of the ramp engaging the tappet surface, in viewing Fig. 1, to the left of a plane perpendicular to the drawing passing through the axis of the tappet whereas the closing portion of the ramp engaging the tappet surface to the right of the same plane. Actually during a rotation of the cam the tappet is rotated back and forth or oscillated during both a lifting and closing cycle thereof but since the frictional resistance imposed on the threads for the threading apart thereof is greater than the resistance between the friction connection of either the screw element with the tappet or the nut with the rocker arm no threading apart occurs. The oscillation of the tappet for the lifting and closing cycles of operation thereof as engaged by the cam occurs as a result of the movement of line contact between the peripheral surface of the cam and tappet moving approximately from a line crossing the axis of the tappet to a line approximately tangential to the outer periphery of the tappet and back again to the center line wherein the cam has moved from its base circle to the apex of the ramp. A like operation results from movement of the cam between apex engagement with the tappet at approximately its center line to base circle engagement therewith near its center line. As a result of the tappet being turned counter-clockwise through a predetermined angle its effects by way of the friction connection between the tappet and screw element to rotate the screw therewith, and in view of the left-hand thread relation between the screw and nut elements a threading up between said elements occurs resulting in a shortening of the pushrod assembly since the frictional resistance between the nut element and rocker arm and between the screw and tappet is greater than the resistance to threading up between the screw and nut elements.

At the conclusion of the valve closing position of a valve operation the cam moves to its base circle whereupon the load of the valve spring 22 is removed therefrom. During the course of rotation of the cam at its base circle association with the tappet surface 60, the lift loss introduced into the valve operation by the shortening of the pushrod assembly has either been compensated for by this time by an equal expansion which may have occurred in the mechanism or the spring 36 operates to elongate the pushrod assembly to return the valve operating mechanism to zero clearance condition at base circle of the cam and thus restore the lift loss amount introduced or account for any contraction or wear that might possibly occur in the mechanism. In the elongation operation of the pushrod the spherical end 40 of the screw element is free to rotate relative to its friction seating connection with the tappet and thus readily compensate without requirement of turning the tappet relative to the cam at this time.

While the nut element is shown as having permissible turning relation with the rocker arm, about its axis it could just as well be constructed as restricted from such permissible movement, if so desired.

Figs. 7 and 8 illustrate a modified form of tappet 100 from Figs. 1 through 6 wherein the cam engaging surface 102 thereof is formed to provide both an angular planar surface F and a helical surface G merging smoothly approximately along a line H as shown by Fig. 8. The helical and angular surfaces are both purposely exaggerated to emphasize their comparison and the means for effecting desired relative movement between the tappet and cam in the engagement therebetween. The angular surface F is represented by parallel straight lines 102 whereas, the helical surface G is represented by the curved lines 104. The surface F lies in a plane angularly disposed to the axis of the tappet but perpendicular to a plane passing through the axis of the tappet.

With the combined angular and helical surfaces on the tappet a rotation or turning of the tappet occurs during the engagement of the helical surface of the tappet with the cam being utilized to effect a valve operation. Whereas the helical surface of the tappet provide for a positive rotation thereof the angular surface assumes line contact engagement with the cam in adjusting for any inaccuracies in the cam surface or right angle arrangement between the axes of the cam and tappet but because of its planar nature does not account for any turning or oscillation of the tappet. Through the use of approximately only a ½ helical surface on the tappet and disposed as shown by Fig. 7 therein it is possible to control the rotation of the tappet for the particular portion of the cycle of valve mechanism operation desired, that is the introduction of lift loss over a limited and desired range of valve mechanism operation.

Figs. 9 and 10 illustrate a further modified tappet 200 from that shown by Figs. 7 and 8 in that the cam engaging surface 202 thereof is formed to provide two angular planar surfaces $F^1$ and $F^2$ merging smoothly into a helical surface $G^1$ disposed therebetween. Whereas the surfaces, $F^1$ and $F^2$ likewise as surface F on tappet 100 provide for adjustment of inaccuracies between a cooperating cam and tappet the helical surface affords a positive rotation of the tappet.

Figs. 7 through 10 are primarily illustrative of variations in tappet structure from that of Figs. 1 through 6 wherein it is conceivable that the helical surface of the tappet may be disposed entirely across the tappet cam engaging face or over a selected portion thereof whereby the rotation thereof can be controlled both as to amount and preferable portion of the cycle of operation of the valve mechanism desired.

It is to be noted that whereas the lines E of Fig. 2 represent a continuous curved or cam surface extending the full width of the tappet, lines G and $G^1$ represent only cam surfaces extending over portions of the engaging surfaces of the tappets 100 and 200 respectively. The amount of rotation or turning incorporated into the cam curved portions of the tappets 14, 100 and 102 is represented by the curvature lines E, G and $G^1$ compared to a straight line, that is in the case of Fig. 8 the angularity Y between lines F extended and a mean of lines G, and in the case of Fig. 10 the angularity between lines $F^1$ extended and a mean of lines $G^1$.

While this invention has been described in connection with certain specific embodiments such as to the portion of surfaces of the tappets being helical, it is obvious that other cam surfaces could serve a like effective purpose and the principle involved is susceptible of numerous other applications that will readily occur to persons skilled in the art. The invention, therefore, is limited only as indicated by the scope of the appended claims.

What I claim is:

1. A valve operating mechanism comprising threadingly engaged screw and nut members, a spring normally biasing the members apart and means engageable with one of the members having a face on one end thereof, at least a portion of the face being a banked cam surface, said member, having the face on one end thereof, being cylindrical.

2. Mechanism according to claim 1 wherein the means constitutes a tappet.

3. Mechanism according to claim 1 wherein the cam surface is helical.

4. Mechanism according to claim 2 wherein a cam, forming part of the mechanism, is provided having a peripheral surface parallel to the axis thereof, and having its peripheral surface engageable with the tappet face with the axes of the tappet and cam substantially perpendicular to one another.

5. A valve operating mechanism comprising threadingly engaged screw and nut members, a spring normally biasing the members apart and means engageable with one of the members having a face on one end thereof including an angular surface and a banked cam surface merging together, said member, having the face on one end thereof, being cylindrical.

6. A valve operating mechanism comprising threadingly engaged screw and nut members, a spring normally biasing the members apart and means engageable with one of the members having a face on one end thereof including a banked cam surface arranged intermediate two angular surfaces in merging relation thereto, said member, having the face on one end thereof, being cylindrical.

7. Mechanism according to claim 2 wherein the screw and nut members constitute a pushrod, one member of which has frictional engagement with the tappet opposite from the face of the tappet and wherein a rocker arm, forming part of the mechanism, is provided having frictional engagement with the other member.

8. Mechanism according to claim 5 wherein the angular surface lies in a plane perpendicular to a plane passing through the axis of the tappet.

9. Mechanism according to claim 5 wherein a cam, forming part of the mechanism, is provided having a peripheral surface parallel to the axis thereof, and having its peripheral surface engageable with the tappet face with the axes of the tappet and cam substantially perpendicular to one another.

10. Mechanism according to claim 6 wherein one of the angular surfaces lies in a plane perpendicular to a plane passing through the axis of the tappet.

11. Mechanism according to claim 7 wherein a cam, forming part of the mechanism, is provided having a peripheral surface parallel to the axis thereof, and having its peripheral surface engageable with the tappet face with the axes of the tappet and cam substantially perpendicular to one another, and wherein a greater frictional resistance to turning is had between the one member and the rocker arm than the frictional resistance to threading up of the members.

12. A cylindrical tappet adapted for axial reciprocation having a cam engaging face on one end thereof, at least a portion of the face being a banked cam surface.

13. A cylindrical tappet adapted for axial reciprocation having a cam engaging face on one end thereof including merging banked cam and angular surfaces.

14. A cylindrical tappet adapted for axial reciprocation having a cam engaging face on one end thereof including two angular surfaces merging with a helical surface disposed therebetween.

15. A tappet according to claim 13 wherein the angular surface lies in a plane perpendicular to a plane passing through the axis of the tappet.

16. Mechanism according to claim 12 wherein the cam surface is helical.

17. A cylindrical tappet adapted for axial reciprocation having a cam engaging face on one end thereof at least a portion of the face having a progressively different rate of contour.

18. A cylindrical tappet adapted for axial reciprocation having a cam engaging face on one end thereof, at least a portion of the face having compound curvature.

References Cited in the file of this patent

UNITED STATES PATENTS

| Number | Name | Date |
|---|---|---|
| 1,798,508 | Tucker | Mar. 31, 1931 |
| 1,820,891 | Spiller | Aug. 25, 1931 |
| 1,903,078 | Woolman | Mar. 28, 1933 |
| 1,907,631 | Warren | May 9, 1933 |